United States Patent [19]

Brooks et al.

[11] Patent Number: 4,963,719
[45] Date of Patent: Oct. 16, 1990

[54] BAR CODE SCANNER AND METHOD OF SCANNING

[75] Inventors: Michael T. Brooks, Veneta; Craig D. Cherry, Eugene, both of Oreg.

[73] Assignee: Spectra-Physics, San Jose, Calif.

[21] Appl. No.: 430,500

[22] Filed: Nov. 1, 1989

[51] Int. Cl.⁵ .............................................. G06K 7/10
[52] U.S. Cl. ................................... 235/462; 235/463; 235/470; 382/9
[58] Field of Search ............... 235/462, 470, 463, 472, 235/466, 467; 382/9

[56] References Cited

U.S. PATENT DOCUMENTS

| | | | |
|---|---|---|---|
| 4,125,765 | 11/1978 | Cowardin et al. | 235/463 |
| 4,160,901 | 7/1979 | Nakanishi et al. | 235/462 |
| 4,667,089 | 5/1987 | Shirakabe et al. | 235/462 |
| 4,764,668 | 8/1988 | Hayard | 235/470 |
| 4,776,024 | 10/1988 | Katoh et al. | 382/9 |
| 4,873,426 | 10/1989 | Sarna et al. | 235/462 |

Primary Examiner—Stuart S. Levy
Assistant Examiner—Kenton R. Mullins
Attorney, Agent, or Firm—Killworth, Gottman, Hagan & Schaeff

[57] ABSTRACT

A scanning method and scanning system according to the present invention determines the bar code data printed on a pair of concatenated, two-segment bar code labels, which labels have been scanned by repeatedly sweeping a beam in a succession of scanning passes to determine the left segment data and the right segment data of each of the pair of labels. The labels are of the type in which the left segment data and the right segment data are combinable to form a valid checksum. During scanning, it is noted if a left segment and a right segment were scanned during a single scanning pass across either or both of the pair of labels. Left segment data from a first left segment is combined with right segment data from a first right segment. If a valid first checksum results, the same left data is combined with right segment data from a second right segment. If a valid second checksum results, then left segment data from the second left segment is combined with right segment data from the first right segment. If a valid third checksum results, then the same left data is combined with the right segment data from the second right segment to calculate a fourth checksum. If all the checksums are valid, and if a left segment and a right segment were scanned during a single scanning pass, then those segments scanned are accepted as having been printed on the same label.

13 Claims, 4 Drawing Sheets

BAR CODE SCANNER AND METHOD OF SCANNING

BACKGROUND OF THE INVENTION

The present invention relates to a computer controlled bar code scanner and a method of scanning and, more particularly, to such scanning apparatus and to such a method in which items bearing two bar code labels, each label being of the type having two segments, may be successfully scanned with the correct segment pairs associated together as labels.

Numerous types of stationary laser scanners are known in which a beam of laser light is swept in a scan pattern to find and read a bar code printed on a surface which is presented to the scanner, such as for example a package label. Bar code labels are used on a broad range of retail packages for check-out and inventory purposes. A scanner, located for example at the check-out station in a retail establishment, is used by a clerk automatically to enter product identification data into an associated computer system.

Typically such a scanner includes a laser source, such as a gas discharge laser, which produces a low power laser beam. The beam then passes through appropriate optical lenses and is swept across the package surface by a motor-driven, rotating mirror assembly. The package bearing a bar code label is presented manually to the scanner by a clerk. A portion of the light reflected from the package surface returns through the optical lenses to a detector which provides an electrical signal in dependence upon the level of the reflected light. A signal processing system in the scanner then analyses the electrical signal and translates the scanned characters into data which is transmitted to the host computer.

The computer determines the total price of the products being purchased, as well as storing the identity of the purchased products for inventory and accounting purposes. The host computer may be located in the cash register associated with the scanner. Alternatively, a single host computer may service a number of scanners at the retail establishment.

The basic requirement for high volume transaction laser scanners is to operate in a way that the store check-out clerk does not have to worry about the label orientation as the product label is passed over the scanner. The basic function of the scan pattern generating arrangement is to move the beam of laser light through a three dimensional pattern capable of finding and reading labels accurately in as many label orientations as possible.

A number of different bar codes have come into use. The more common ones are horizontal in design with alternating vertical dark bars and light spaces therebetween. The height of the bars has no purpose other than to permit a scanning beam to successfully pass over the entire length of the bar code to permit its reading in one scanning pass. Common codes include Code Three of Nine, Two of Five, Codabar, Two of Five Non-Interleaved, Two of Five Interleaved, UPC-A, UPC-E, EAN-13, and EAN-8. A label printed in a UPC or EAN family code actually includes two related segments of data.

All UPC/EAN family labels are checked for validity in two ways: the segments comprising the label are checked by having a unique parity pattern and the segments when assembled into a label produce a unique checksum. EAN-13 labels are formed by an EAN-13 left half segment and a UPC-A right half segment. For a given EAN-13 label the check-sum is calculated by weighting the characters making up the segment halves as follows.

|  | EAN-13-LEFT HALF SEGMENT | UPC-A-RIGHT HALF SEGMENT |
| --- | --- | --- |
| CHARACTER | 1 2 3 4 5 6 7 | 1 2 3 4 5 6 |
| WEIGHT | 1 3 1 3 1 3 1 | 3 1 3 1 3 1 |

The sum of these weighted values, the checksum, must be evenly divisible by ten or the label is discarded as invalid. Given that the characters of any UPC/EAN label are the decimal digits 0 through 9, only one unique check character will yield a valid checksum.

In some applications, pairs of EAN-13 labels may be located on the same product. It is important for the scanner system to be able to distinguish those pairs of scanned labels which are affixed to the same product and, also, which of the labels in each such pair is the "first" label and which of the labels is the "second" label. Toward this end, the first two characters on each label are predetermined characters if the label is the first or second of a label pair affixed to the same product.

The application of two labels to a single product makes label decoding particularly difficult when the labels are printed in a code in which each label is made up of two segments. When decoding two segment labels, such as those in the UPC/EAN family, prior art scanners do not decode the entire labels at once. Instead, segments which comprise labels are collected into an array and are later assembled into labels. Which of the UPC-A right half segments goes with each of the two EAN-13 left half segments has typically been decided in prior art scanner systems by trial and error. The scanner system would attempt to make an EAN-13 label by selecting a right half segment and a left half segment, and using the paired segments to calculate a checksum. Only in those cases where both of the labels of the EAN-13 label pair yield a valid checksum is the scan data accepted. Even then, however, the right and left segments may not have been properly paired since, in ten percent of the cases, either of the UPC-A right half segments will produce a valid checksum with either of the EAN-13 left half segments. Clearly this is unacceptable since invalid data is inserted into the scanning system, and there is no indication in the operation of the scanning system that such an error has occurred. As a consequence, in prior art systems when this condition was encountered the label pair was rejected and a special error flag was set to let the operator know that this had happened.

Accordingly, there is a need for a scanner and a method of scanning in which several multiple segment bar code labels may be read with the scan data from scanning segments on each label being properly associated after scanning.

SUMMARY OF THE INVENTION

These needs are met by a method and apparatus according to the present invention for scanning a pair of bar code labels to determine the bar code data printed thereon by repeatedly sweeping a beam in a succession of scanning passes. Each label has a right segment defining right segment data and a left segment defining left segment data, and the left segment data and right segment data from each label combine to form a valid checksum. The method includes the steps of scanning the pair of labels to determine the left segment data of the pair of labels and the right segment data of the pair of labels, if a left segment and a right segment were scanned during a single scanning pass across either or both of the pair of labels, storing an indication thereof, selecting left segment data from a first left segment and right segment data from a first right segment and calculating a first checksum, if the first checksum is valid, then selecting left segment data from the first left segment and right segment data from the second right segment and calculating a second checksum, if the second checksum is valid, then selecting left segment data from the second left segment and right segment data from the first right segment and calculating a third checksum, if the third checksum is valid, then selecting left segment data from the second left segment and right segment data from the second right segment and calculating a fourth checksum, if the first, second, third, and fourth checksum data are valid, and if a left segment and a right segment were scanned as the beam made a single scanning pass across a pair of labels, then accepting the left segment and a right segment which were scanned as the beam made a single scanning pass across the pair of labels as providing scan data from the same label, and the other left segment and right segment as providing scan data from the other label, and if the first, second, third, and fourth checksum data are valid, and if a left segment and a right segment were not scanned as the beam made a single scanning pass across either of the pair of labels, then rejecting the data from the first and second left segment and the first and second right segment.

The step of scanning the pair of labels to determine the left segment data of the pair of labels and the right segment data of the pair of labels, may include the step of scanning a pair of EAN-13 labels affixed to a single product. Alternatively, the step of scanning the pair of labels to determine the left segment data of the pair of labels and the right segment data of the pair of labels, may include the step of scanning a pair of UPC-A labels affixed to a single product. Alternatively, the step of scanning the pair of labels to determine the left segment data of the pair of labels and the right segment data of the pair of labels, may include the step of scanning a pair of EAN-8 labels affixed to a single product.

A computer controlled bar code scanner system according to the present invention scans a pair of bar code labels to determine the bar code data printed thereon by repeatedly sweeping a beam in a succession of scanning passes. Each label has a right segment defining right segment data and a left segment defining left segment data. The left segment data and right segment data from each label may be combined to form a valid checksum. The scanner includes scanner means for sweeping a scanning beam across a scanning station and providing a scan signal indicating markings on surfaces presented to the scan station. The scanner further includes computer means, responsive to the scanner means, for interpreting the scan signal as scan data signified by scanned bar code labels. The computer means includes means for controlling the scanner means to perform the steps of:

scanning the pair of labels to determine the left segment data of the pair of labels and the right segment data of the pair of labels, if a left segment and a right segment were scanned during a single scanning pass across either or both of the pair of labels, storing an indication thereof, selecting left segment data from a first left segment and right segment data from a first right segment and calculating a first checksum, if the first checksum is valid, then selecting left segment data from the first left segment and right segment data from the second right segment and calculating a second checksum, if the second checksum is valid, then selecting left segment data from the second left segment and right segment data from the first right segment and calculating a third checksum, if the third checksum is valid, then selecting left segment data from the second left segment and right segment data from the second right segment and calculating a fourth checksum, if the first, second, third, and fourth checksum data are valid, and if a left segment and a right segment were scanned as the beam made a single scanning pass across a pair of labels, then accepting the left segment and a right segment which were scanned as the beam made a single scanning pass across the pair of labels as providing scan data from the same label, and the other left segment and right segment as providing scan data from the other label, and if the first, second, third, and fourth checksum data are valid, and if a left segment and a right segment were not scanned as the beam made a single scanning pass across either of the pair of labels, then rejecting the data from the first and second left segment and the first and second right segment.

Accordingly, it is an object of the present invention to provide a bar code scanning method and scanning system in which concatenated pairs of bar code labels are scanned to determine the bar code data printed thereon by repeatedly sweeping a scanning beam in scan paths across the labels; to provide such a bar code scanning method and scanning system in which the labels bear bar codes of the type which each include a right half segment and a left half segment and in which the segments may or may not be scanned during one scanning pass; and to provide such a bar code scanning method and scanning system in which each right half label segment can be correctly paired with its corresponding left half label segment and the label segment data included on the label segments properly associated.

Other objects and advantages of the invention will be apparent from the following description, the accompanying drawings and the appended claims.

DETAILED DESCRIPTION OF THE PREFERRED EMBODIMENT

Figure 1:
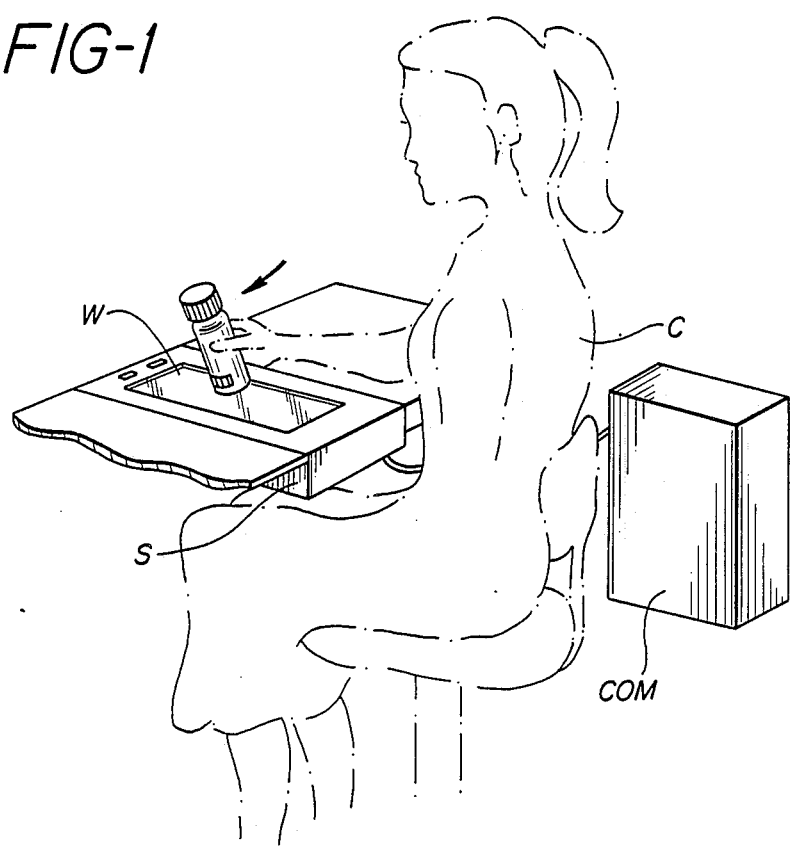
FIG. 1 is a pictorial view of a sales clerk at a checkout counter, presenting a product carrying a bar code label at a scanning station above the window of a laser scanner.

Reference is made to FIG. 1 of the drawings which illustrates a computer controlled bar code scanner system according to the present invention for scanning bar code labels to determine the bar code data printed thereon. As is explained more fully below, this bar code scanner is capable of scanning a pair of bar code labels to determine the bar code data printed thereon by repeatedly sweeping a beam in a succession of scanning passes. The labels presented for scanning are typically UPC-A, EAN-13, or EAN-8 labels. As is known, each label of the UPC/EAN family has a right segment defining right segment data and a left segment defining left segment data. The left segment data and right segment data from each label of this type are combinable to form a valid checksum when the label is correctly scanned. FIG. 1 is a pictorial view of a sales clerk C at a checkout counter, with a laser scanner system of this type being used to scan a product label.

The clerk C manually passes the product across a scanning station over a window W. The scanning beam emerges from the window so as to permit the beam to be swept across the label in a scanning pass. A portion of the light reflected from the label passes downward from the arrangement of bars on the product label. The beam is caused to rapidly sweep through a series of scan paths which collectively produce a scan pattern in which the likelihood of a successful scan is high. It is desired that the scan pattern be such that it is highly probable that at least one scan path will traverse the label in a direction more or less perpendicular to the bars making up the bar code.

The scanner system of the present invention includes a scanner S comprising a scanner means for sweeping a scanning beam across the scanning station and providing a scan signal indicating markings on surfaces presented to the scan station. The scanner also includes computer means, such as computer COM, which is responsive to the scanner S for interpreting the scan signal as scan data signified by scanned bar code labels. The computer COM controls operation of the scanner S, determines whether bar code labels or label segments have been scanned properly, and whether valid scan data has been obtained.

Figure 2:
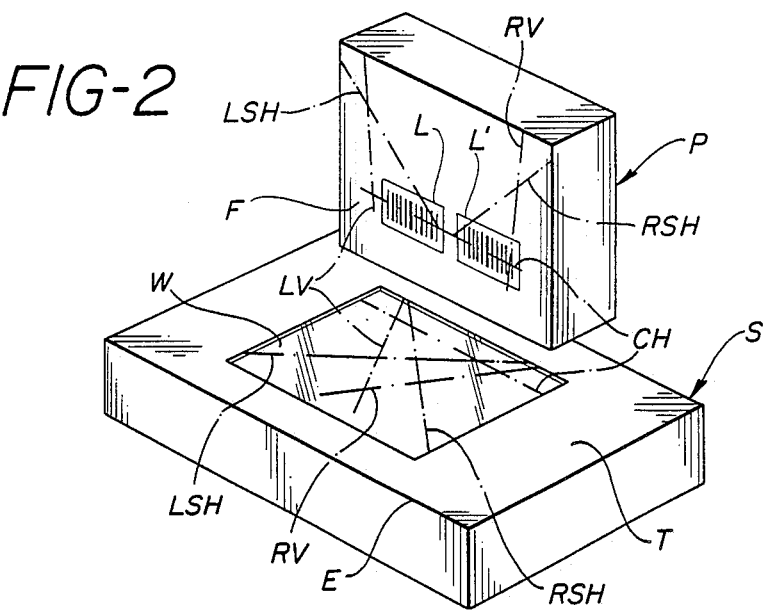
FIG. 2 is a perspective view of the laser scanner and a package disposed above the scanner and parallel to the front edge thereof and in a vertical position wherein a cross bar X scan pattern is projected on the scanner window and on the package face.

In common with many scanners in use today, the illustrated scanner uses a variation of what can be called a "cross-bar X" scan pattern. FIG. 2 illustrates this scan pattern on the window W of the scanner S and on a face F of a package P, bearing a pair of bar code labels L and L', disposed parallel to the front edge E of the scanner S and in a vertical position. The cross bar X pattern consists of five basic scan lines: the center horizontal (CH) line, right and left side horizontal (RSH & LSH) lines, and right and left vertical (RV & LV) lines. Note the orthogonality of the RV and LV scan lines with the CH scan lines. Also note that in this instance, the CH scan line passes over the bar code label in a direction which is generally perpendicular to the bars making up the code.

Figure 3:
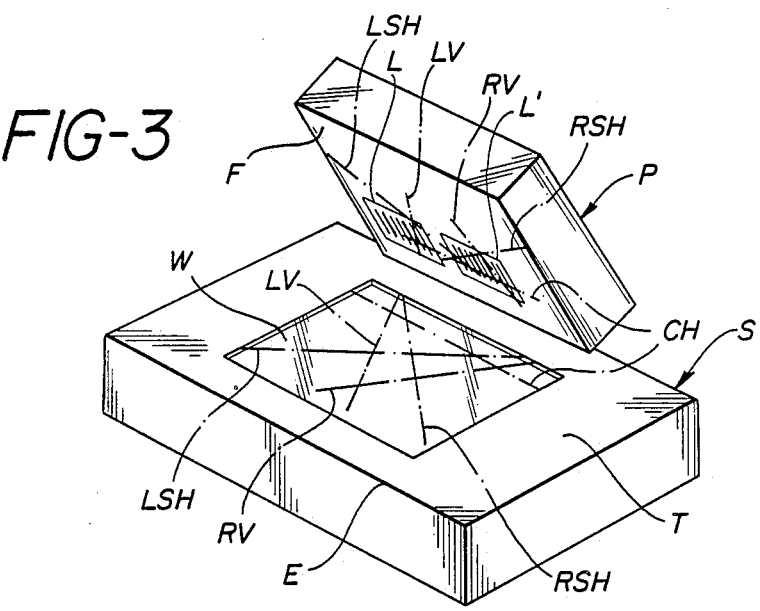
FIGS. 3-5 are perspective views similar to that of FIG. 2 but showing the cross bar X scan pattern on a package disposed at different orientations with respect to the laser scanner.
Figure 4:
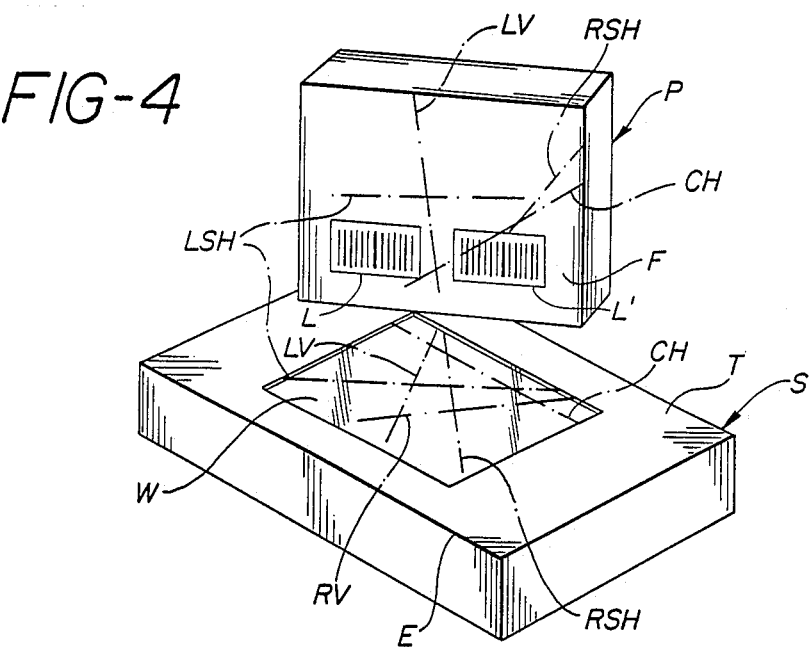
Figure 5:
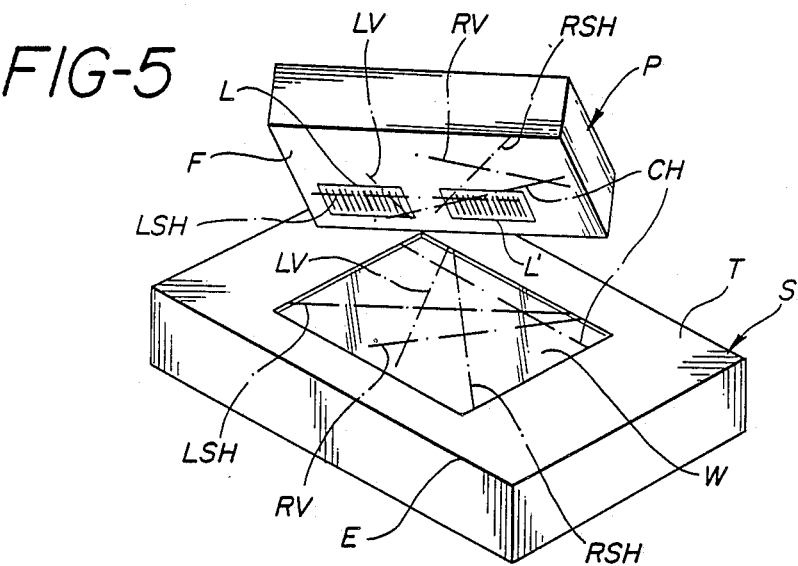

A more intuitive understanding of this scan pattern can be gained by examining depictions of the scan pattern on the package P in different orientations, as shown in FIGS. 3–5. In FIG. 3, the package face F is disposed parallel to the front edge E of the scanner S but leaned forty-five degrees toward the top T of the scanner. Note the orthogonality of the RV and RSH scan lines. In FIG. 4, the package face F is disposed in a vertical position but rotated forty-five degrees from the front edge E of the scanner S. Note the orthogonality of the LV and LSH scan lines. In FIG. 5, the package face F is rotated forty-five degrees from the front edge E of the scanner S and leaned forty-five degrees toward the top T of the scanner. Note the orthogonality of the LV and CH scan lines. In each of FIGS. 2–5, there is at least one set of perpendicularly crossing scan lines even though the label planes are at very different locations. Also note that scan lines CH and LSH are properly positioned for scanning both of the labels L and L' in FIGS. 2 and 5, respectively, that a scan line does not cross the label L and only the left half of the label L' in FIG. 4, and that scan lines LV and CH only pass over a portion of the bar code in label L while traversing all of label L' in FIG. 3.

Figure 6:
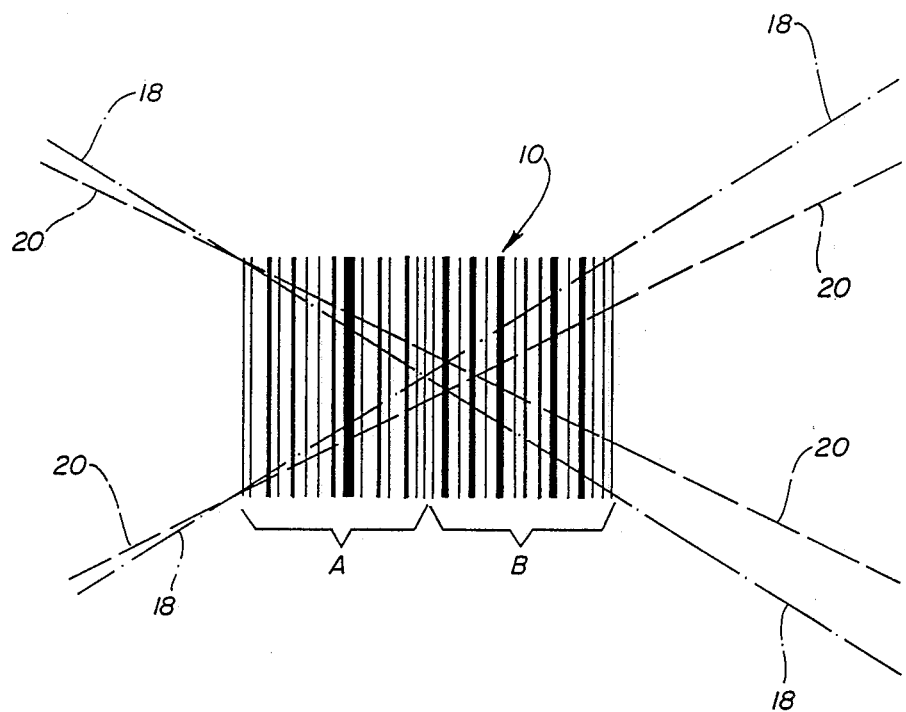
FIG. 6 is a pictorial representation of a two-segment UPC bar code.

Reference is now made to FIGS. 6 which shows a UPC-A bar code label 10 having a right segment B defining right segment data and a left segment A defining left segment data. As explained previously, the left segment data and right segment data from the label may be combined to form a checksum which indicates whether the data which has been scanned is valid. Most UPC code are two segment codes, as are all EAN codes. Typically, conventional scanners have permitted the two segments to be read during different scanning passes in order to increase the range of label orientations in which successful scanning may be accomplished. It will be appreciated, however, that an ambiguity may develop when two labels, such as for example two EAN-13 labels are affixed to the same product and are read more or less simultaneously. Since the scanner may have read two left segments and two right segments separately, a problem developes as to how to associate the proper left and right segments together. Although use can be made of the checksums, with one of the left segments being preliminarily paired with each of the right segments for checksum calculation, in a number of cases it is found that a valid checksum is produced with either right segment being paired with either left segment.

The method of the present invention eliminates this ambiguity in a number of instances. At the time that the pair of labels are scanned to determine the left segment data of the pair of labels and the right segment data of the pair of labels, it is noted if a left segment and a right segment were scanned during a single scanning pass across either or both of the pair of labels. Such passes are illustrated at 18 and 20 in FIG. 6. If, in fact, a left segment and a right segment were scanned during a single scanning pass across either or both of the pair of labels, an indication of this is stored in RAM in the computer COM. This data is not used unless an ambiguity is later determined to exist.

The pairing of the left and right segments for trial checksum calculations initially proceeds in the usual manner. Left segment data from a first left segment and right segment data from a first right segment are selected and a first checksum is calculated. If the first checksum is valid, then left segment data from the first left segment and right segment data from the second right segment are used to calculate a second checksum. If the second checksum is valid, then left segment data from the second left segment and right segment data from the first right segment are used to calculate a third checksum. If the third checksum is valid, then left segment data from the second left segment and right segment data from the second right segment are use to calculate a fourth checksum.

At this point it will be appreciated that, if the fourth checksum is also valid, an ambiguity exists, since a valid checksum is produced by grouping together either of the right and left segments. The present invention now makes use of the previously stored indication of whether any of the segments was scanned during the same pass as another segment in order to attempt to resolve this ambiguity. If the first, second, third, and fourth checksum data are valid, and if a left segment and a right segment were scanned as the beam made a single scanning pass, then the left segment and a right pass across the pair of labels are accepted as having been printed on the same label. By elimination, then, the remaining left and right segments are accepted as providing scan data from the other label.

It will be appreciated that in some instances, none of the segments will have been scanned during the same scanning pass as another segment. If the first, second, third, and fourth checksums data are valid, and if a left segment and a right segment were not scanned as the beam made a single scanning pass across either of the pair of labels, then the data from the first and second left segment and the first and second right segment are rejected. The operator is given an indication that a proper scan has not been made, providing him with the opportunity to rescan the labels.

The scanning method of the present invention is preferably performed utilizing dual programmed microprocessors, operating a parallel mode. In one embodiment of the invention, segment decoding including marking of segments that were contiguous, that is segments which were scanned during a single scanning pass, was performed utilizing a Motorola 68000 microprocessor, while label assembly was performed utilizing a National Semiconductor HPC/68HC11 microprocessor. The software utilized to control these microprocessors in effecting the method of the present invention is as follows.

```
* DECODER CODE FRAGMENT.
*
* SEND A DECODED SEGMENT OR BUFFER A POSSIBLY CONTIGUOUS PAIR OF SEGMENTS
* FOR SENDING LATER TO THE CONTROLLER. POSSIBLE CONTIGUOUS PAIRS ARE:
*      UPC-A, L   +  UPC-A, R    or   UPC-A, R  +  UPC-A, L
;*     EAN-13, L  +  UPC-A, R    or   UPC-A, R  +  EAN-13, L
;*     EAN-8, L   +  EAN-8, R    or   EAN-8, R  +  EAN-8, L
;* OTHER SEGMENTS ARE NEVER SENT AS CONTIGUOUS PAIRS.
;*
;*****************************************************************************

:
   :
   :

;* SEGMENT FOUND BACKWARD IN THE BUFFER. SEGMENT IS DECODED FROM MARGIN
;* BACKWARD TO CENTER BAND. (S.P. ALGORITHM C914)

move.b     d3, d7           ; send seg. type byte bsr        outch
              cmp.b      #03Fh, d3        ; else, test seg type; is it UPC_A, R ?
              beq.s      c914_5
              cmp.b      #0Ch, d3         ; or UPC D, N1 ?
              beq.s      c914_5
              cmp.b      #018h, d3        ; or EAN8, R ?
              beq.s      c914_5 bra.s      c914_7           ; if not one of these, skip next step
c914_5:       move.b     label_buf, d5    ; if UPC_A, R or UPC_D1 or EAN8, R move
c914_6:       move.b     -(a4), d7        ; seg reversed
              bsr        outch
              subq.b     #1, d5
              bne.s      c914_6
              bra.s      c914_9
c914_7:       movea.l    #label_buf, a1   ; else, move string forward
              move.b     (a1)+, d5
c914_8:       move.b     (a1)+, d7
              bsr        outch
              subq.b     #1, d5
              bne.s      c914_8
``` c914_9:
;
;
;

;* SEGMENT FOUND FOREWARD IN THE BUFFER. SEGMENT IS DECODED FROM MARGIN
;* FOREWARD TO CENTER BAND. (S.P. ALGORITHM C919)

```
            move.w      d3,d7            ; get segment type byte cmp.b       #03Fh,d3         ; UPC-A,R
            beq         c919_4b
            cmp.b       #03Ah,d3         ; UPC-A,L
            beq         c919_4b
            cmp.b       #01Dh,d3         ; EAN13,L
            beq         c919_4b
            cmp.b       #019h,d3         ; EAN8,L
            beq         c919_4b
            cmp.b       #018h,d3         ; EAN8,R
            beq         c919_4b
;
919_4a:     bsr         outch
            cmp.b       #03Fh,d3         ; else, test seg type; is it UPC_A,R ?
            beq.s       c919_5a
            cmp.b       #0Ch,d3          ; or UPC D,H1 ?
            beq.s       c919_5a
            cmp.b       #018h,d3         ; or EAN8,R ?
            beq.s       c919_5a
            bra         c919_7a          ; if not one of these, skip next step
                                         ; if UPC_A,R or UPC_D1 or EAN8,R reverse
                                         ; string (scanned it backwards).
;919_5a:    moveq       #0,d5
            move.b      label_buf,d5
            moves.l     #label_buf,a4    ; construct a pointer 1 past the
            add.w       d5,a4            ; last chr in buffer
            addq.w      #1,a4
c919_6a:    move.b      -(a4),d7         ; move chr's offset pre-incremented
            bsr         outch
            subq.b      #1,d5
            bne.s       c919_6a
            bra         c919_9
c919_7a:    moves.l     #label_buf,a4    ; else, store seg string non-reversed
            move.b      (a4)+,d5
c919_8a:    move.b      (a4)+,d7
            bsr         outch
            subq.b      #1,d5
            bne.s       c919_8a
            cmp.b       #0,lbufl
            beq         c919_8aa
            bsr         MT_lbufl
c919_8aa:
            bra         c919_9
;***
c919_4b:    cmp.b       #0,lbufl         ; lbufl had better be empty here
            beq         c919_4bb         ; if it isn't, empty it
            bsr         MT_lbufl
```

```
c919_4bb:
         move.b     d3,d7              ; get back the segment I.D.
         movea.l    #lbuf1+1,a0        ; construct a pointer into lbuf1 move.b     d7,(a0)+           ; move seg. I.D. into lbuf1
         addq.b     #1,lbuf1 cmp.b      #03Fh,d3           ; else, test seg type; is it UPC_A,R ?
         beq.s      c919_5b
         cmp.b      #0Ch,d3            ; or UPC D,N1 ?
         beq.s      c919_5b
         cmp.b      #018h,d3           ; or EAN8,R ?
         beq.s      c919_5b
         bra        c919_7b            ; if not one of these, skip next step
                                       ; if UPC_A,R or UPC_D1 or EAN8,R reverse
                                       ; string (scanned it backwards).

c919_5b: moveq      #0,d5
         move.b     label_buf,d5
         movea.l    #label_buf         ; construct a pointer 1 par' +'
         add.w      d5,a4              ; last chr in buffer
         addq.w     #1,a4
919_6b:  move.b     -(a4),d7           ; move chr's offset pre-incremented
         move.b     d7,(a0)+           ; into lbuf1
         addq.b     #1,lbuf1
         subq.b     #1,d5
         bne.s      c919_6b
         bra        c919_9
;919_7b: movea.l    #label_buf,a4      ; else, store seg string non-reversed
         move.b     (a4)+,d5
;919_8b: move.b     (a4)+,d7
         move.b     d7,(a0)+
         addq.b     #1,lbuf1
         subq.b     #1,d5
         bne.s      c919_8b
c919_9:
         ;
         ;
         ;

;* SEGMENT FOUND FOREWARD IN THE BUFFER. SEGMENT IS DECODED FROM MARGIN
;* FOREWARD TO CENTER BAND. (S.P. ALGORITHM C919)

move.w     d3,d7              ; get segment type byte cmp.b      #03Fh,d3           ; UPC-A,R
         beq        c920_1b
         cmp.b      #03Ah,d3           ; UPC-A,L
         beq        c920_1b
         cmp.b      #01Dh,d3           ; EAN13,L
         beq        c920_1b
         cmp.b      #019h,d3           ; EAN8,L
         beq        c920_1b
         cmp.b      #018h,d3           ; EAN8,R
         beq        c920_1b
;*
c920_1a: bsr        outch
         cmp.b      #03Fh,d3           ; else, test seg type; is it UPC_A,R ?
```

```
          beq.s     c920_4a
          cmp.b     #0Ch,d3          ; or UPC_D1 ?
          beq.s     c920_4a
          cmp.b     #018h,d3         ; or EAN8,R ?
          beq.s     c920_4a
                                     ; if not one of these, reverse the string
                                     ; (scanned it backwards)
c920_2a:  moveq     #0,d5
          move.b    label_buf,d5     ; get segment count
          movea.l   #label_buf,a4    ; construct a pointer 1 past the
          add.w     d5,a4            ; last chr in buffer
          addq.w    #1,a4
c920_3a:  move.b    -(a4),d7         ; move chr's offset pre-incremented
          bsr       outch
          subq.b    #1,d5
          bne.s     c920_3a
          bra       c920_6
c920_4a:  movea.l   #label_buf,a4    ; else, store seg string non-reversed
          move.b    (a4)+,d5
:920_5:   move.b    (a4)+,d7
          bsr       outch
          subq.b    #1,d5
          bne.s     c920_5a
          cmp.b     #0,lbufl
          beq       c920_5aa
          bsr       MT_lbufl         ; if ever we get here, empty lbufl
:920_5aa:
          bra       c920_6
;***
:920_1b:  cmp.b     #0,lbufl         ; lbufl empty?
          beq       c920_1a          ; just send the segment
          movea.l   #lbufl,a0
          moveq     #0,d5
          move.b    (a0)+,d5
          add.l     d5,a0            ; point a0 just past last chr in lbuf move.b    d7,(a0)+         ; store away the segment I.D.
          addq.b    #1,lbufl cmp.b     #03Fh,d3         ; else, test seg type; is it UPC_A,R ?
          beq.s     c920_4b
          cmp.b     #0Ch,d3          ; or UPC_D1 ?
          beq.s     c920_4b
          cmp.b     #018h,d3         ; or EAN8,R ?
          beq.s     c920_4b
                                     ; if not one of these, reverse the string
                                     ; (scanned it backwards)
c920_2b:  move.b    label_buf,d5     ; get segment count
          movea.l   #label_buf,a4    ; construct a pointer 1 past the
          add.w     d5,a4            ; last chr in buffer
          addq.w    #1,a4
c920_3b:  move.b    -(a4),d7         ; move chr's offset pre-incremented
          move.b    d7,(a0)+
          addq.b    #1,lbufl
          subq.b    #1,d5
          bne.s     c920_3b
          bra       c920_6
c920_4b:  movea.l   #label_buf,a4    ; else, store seg string non-reversed
          move.b    (a4)+,d5
```

```
c920_5b:   move.b    (a4)+,d7
           move.b    d7,(a0)+
           addq.b    #1,lbuf1
           subq.b    #1,d5
           bne.s     c920_5b
           cmp.b     #0,lbuf1
           beq       c920_6
           bsr       MT_lbuf1 c920_6:
               :
               :
               :
```

```
;*********************************************
;* LBUF1 possible contiguous segment configurations:
;*        0   1   2   3   4   5   6   7   8   9  10  11  12  13  14  15
;*        #  ID  c1  c2  c3  c4  ID  c1  c2  c3  c4                          4+4
;*        #  ID  c1  c2  c3  c4  c5  c6  ID  c1  c2  c3  c4  c5              6+6
;*        #  ID  c1  c2  c3  c4  c5  c6  ID  c1  c2  c3  c4  c5  .   c7      6+7
;*        #  ID  c1  c2  c3  c4  c5  c6  c7  ID  c1  c2  c3  c4  c5  c6      7+6

T_lbuf1:
           move.b    lbuf1+1,d0        ; get I.D. of first seg.

cmp.b     #03Fh,d0          ; UPC A,R?
           beq       MT_LupcAR
           cmp.b     #03Ah,d0          ; UPC A,L?
           beq       MT_LupcAL
           cmp.b     #01Dh,d0          ; EAN13 L?
           beq       MT_Lean13L
           cmp.b     #019h,d0          ; EAN8 L?
           beq       MT_Lean8L
           cmp.b     #018h,d0          ; EAN8 R?
           beq       MT_Lean8R
           bra       send_lbuf1

MT_LupcAR:
           cmp.b     #03Ah,lbuf1+8     ; is next seg in lbuf1 a UPC A,L?
           bne.s     MT_LupcAR1        ; no...
           bra       set_lbuf1
MT_LupcAR1:
           cmp.b     #01Dh,lbuf1+8     ; then, is it an EAN13 L?
           bne.s     send_lbuf1        ; no...
           bra       set_lbuf1

MT_LupcAL:
           cmp.b     #03Fh,lbuf1+8     ; is next seg in lbuf1 a UPC A,R?
           bne.s     send_lbuf1        ; no...
           bra       set_lbuf1

MT_Lean13L:
           cmp.b     #03Fh,lbuf1+9     ; is next seg in lbuf1 a UPC A,R?
           bne.s     send_lbuf1        ; no...
           bra       set_lbuf1

MT_Lean8L:
           cmp.b     #018h,lbuf1+6     ; is next seg in lbuf1 an EAN8 R?
           bne.s     send_lbuf1        ; no...
           bra       set_lbuf1
```

```
MT_Lean8R:
        cmp.b       #819h,lbuf1+6       ; is next seg in lbuf1 an EAN8 L?
        bne.s       send_lbuf1          ; no...

set_lbuf1:
        bset.b      #7,lbuf1+1          ; yes...set high bit of first seg we send send_lbuf1:
        movea.l     #lbuf1+1,a4         ; get the base addr. of lbuf1
        move.b      lbuf1,d0            ; get chr count in d0
        cmp.b       #0,d0
        beq         cleanup
send_lbuf2:
        move.b      (a4)+,d7            ; send chr stream
        bsr         outch
        subq.b      #1,d0
        bne.s       send_lbuf2
cleanup:
        clr.w       lbuf1
        rts ;**************************************************
quit_UPC:
        cmp.b       #0,lbuf1
        beq         no_decode
        bsr         MT_lbuf1
        clr.w       label_buf
        bra         no_decode ;*   ITROLLER SEGMENT #2
;*
;* FINAL LABEL CORRELATION AND ASSEMBLY. IF EAN-13 TWO LABEL PAIR (A.K.A.
;* TEC TWO LABEL) DECIDE IF LABEL PAIR IS AMBIGUOUS. IF AN AMBIGUOUS PAIR
;* IS FOUND CHECK THE CONTIGUOUS LABEL BUFFER TO DECIDE THE POSSIBILITY OF
;* A CONTIGUOUSLY ORDERED PAIR OF ONE OR BOTH OF THE LABELS HAS BEEN FOUND.
;**************************************************************************

:
        :
        :

;* EAN13 label --> ean13_L + upcA_R
;*
ean13:
    jsrl    idav1
    ifgt    16s1+3.b,#0x90              ; if 7th 16sx char is > 9
    jmpl    ean8                        ; try to make an ean8 label

:
        :
        :

ean133:
    ld      xloc.v,#16scnt              ; TEST FOR EAN13_L SEGMENT "L6S1"
    jsrl    majority_test
    ifeq    aloc.b,#0x00                ; fail = 00    pass = -1
    jmpl    ean8

:
        :
        :
```

```
ean135:
        ld      xloc.v,#r6scnt      ; TEST FOR UPCA_R SEGMENT "R6S1"
        jsrl    majority_test
        ifeq    aloc.b,#0x00        ; fail = 00    pass = -1
        jmpl    ean8 ifbit   two_label,flag4.b   ; TEC TWO LABEL mode?
        jmpl    ean13a

;****************************************************
;* STANDARD EAN 13 LABELS
ean136:
        ld      xloc.v,#16s1
        ld      bloc.v,#r6s1
        jsrl    ean13_calck         ; compute label checksum
        ifeq    xloc.b,#0x00        ; test mod.10 result
        jp      ean137
        jsrl    clr6
        jmpl    nocapt1
ean137:
        ld      xloc.v,#16s1        ; get 16s1+r6s1 into upcbuf1
        ld      bloc.v,#r6s1
        jsrl    stuff_13upcbuf1
        ld      IDnx.b,#id_ean13 ifbit   addon,CCR.b         ; addon found ?
        jp      ean13_addon
        jmpl    upcfnd
;*
;* Include the addon character onto the ean13 string. At start UPCBUF1 is
;* structured:
;*     byte:  0      1      2      3      4      5      6      7
;*            count  d1/d2  d3/d4  d5/d6  d7/d8  d9/d10 d11/d12 d13/0
;*
;* The addon string is added as:
;*     byte:  7      8      9      10
;*            d13/a1 a2/a3  a4/a5  #/?
ean13_addon:

:
        :
        :

;****************************************************
; TEC TWO LABEL EAN 13 LABEL PAIRS
; *** AT THIS POINT, IF ANY CONTIGUOUS SEGMENTS HAVE BEEN READ THEY WILL
; *** BE STORED IN CONTseg1 OR CONTseg2 (FOR 1ST AND 2ND FLAGGED LABELS
; *** RESPECTIVELY).
ean13a:
        jsrl    idavl
        clr     A
        ld      A,16s1.b
        ifeq    A,Tflag11.b         ; first label flag pair?
        jp      ean13b
        ifeq    A,Tflag12.b
        jp      ean13b
```

```
        ifeq    A,Tflag13.b
        jp      ean13b
        ifeq    A,Tflag14.b
        jp      ean13b
        jmpl    ean136                  ; no...treat as a "normal" EAN13 label
ean13b:
        ld      xloc.v,#X16scnt         ; TEST FOR EAN13_L SEGMENT "L6S3"
        jsrl    majority_test
        ifeq    aloc.b,#0x00            ; fail = 00    pass = -1
        jmpl    nocapt1 ld      xloc.v,#Xr6scnt         ; TEST FOR UPCA_R SEGMENT "R6S3"
        jsrl    majority_test
        ifeq    aloc.b,#0x00            ; fail = 00    pass = -1
        jmpl    nocapt1
;*************************
                                        ; TRY TO ASSEMBLE THE TEC TWO LABEL PAIR
;*                                      ; FIRST LABEL
        ld      xloc.v,#16s1            ; try it with L6S1 & R6S1
        ld      bloc.v,#r6s1
        jsrl    ean13_calck             ; calc the checksum for 16s1+r6s1
        ifeq    xloc.b,#0               ; test mod.10 result (00 = okay)
        jp      ean13c                  ; okay....
        jmpl    ean13m                  ; no...try 16s1+r6s3
ean13c:                                 ; SECOND LABEL   test L6S3 & R6S3
        ld      xloc.v,#16s3            ; then, assemble 2nd label in upcbuf1
        ld      bloc.v,#r6s3
        jsrl    ean13_calck             ; calc the checksum for 16s3+r  3
        ifeq    xloc.b,#0               ; test mod.10 result (00 = ok.
        jp      ean13d                  ; okay....now, test for ambiguity
        jsrl    clr6                    ; no go!...dump all seg buffers
        jmpl    nocapt1
ean13d:
        ld      xloc.v,#16s1
        ld      bloc.v,#r6s3
        jsrl    ean13_calck             ; ambiguity test
        ifeq    xloc.b,#0               ; ambiguity found!
        jp      ean13e
        jmpl    ean13h                  ; okay...no ambiguity, send the labels
ean13e:
        ifeq    r6s1.v,r6s3.v           ; are right half's the same?
        jp      ean13e_1
        jp      ean13f
ean13e_1:
        ifeq    r6s1+2.b,r6s3+2.b
        jp      ean13e_2
        jp      ean13f
ean13e_2:
        jsrl    clr6
        jsrl    clr_upcbuf1
        jmpl    nocapt1
ean13f:
        ifeq    r6s1.b,CONTseg1+1.b     ; test UPCA-R segment collection order
        jp      ean13f_1
        jp      ean13g
ean13f_1:
        ifeq    r6s1+1.b,CONTseg1+2.b
        jp      ean13f_2
        jp      ean13g
```

```
ean13f_2:
    ifeq    r6s1+2.b,CONTseg1+3.b
    jmpl    ean13h
ean13g:
    ifeq    r6s3.b,CONTseg2+1.b
    jp      ean13g_1
    jsrl    clr6                        ; unresolved ambiguity...dump seg's
    jmpl    nocapti
ean13g_1:
    ifeq    r6s3+1.b,CONTseg2+2.b
    jp      ean13g_2
    jsrl    clr6                        ; unresolved ambiguity...dump seg's
    jmpl    nocapti
ean13g_2:
    ifeq    r6s3+2.b,CONTseg2+3.b
    jp      ean13h
    jsrl    clr6                        ; unresolved ambiguity...dump seg's
    jmpl    nocapti
;*
ean13h:                                 ; final check...double read?
    ld      xloc.v,#16s3
    ld      bloc.v,#r6s3
    jsrl    stuff_13upcbuf1             ; store the 2nd label in upcbuf1
    jsrl    drt13                       ; do double read timeout check on the label
    ifeq    A,#0                        ; A returned as false if invalid timeouts
    jmpl    idle                        ; ok?
                                        ; SEND THE LABEL !!!!
    jsrl    grnon                       ; beep & turn on the green l.e.d.
    jsrl    beep
ean13h_1:
    ifeq    lbuf.b,#0                   ; label buffer empty?
    jp      ean13h_2                    ; yes...stuff it
                                        ; no....send char's out until it is
    jsrl    polled_comm
    ifeq    hook.b,#hk_stravb           ; else, if S&C 6 bit
    jsrl    stravb_ecr_check
    jp      ean13h_1
ean13h_2:
    ld      xloc.v,#16s1
    ld      bloc.v,#r6s1
    jsrl    stuff_13lbuf                ; store the 1st label in lbuf
    ld      xloc.v,#ee_ean13_id
    jsrl    rd93
    st      A,ID.v                      ; put label id's in place!
    ld      IDnx.b,#id_ean13
    ld      IDn.b,#id_ean13
    jsrl    outst
ean13h_3:
    ifeq    lbuf.b,#0                   ; loop here sending chr's out for
    jp      ean13h_4                    ; the first label until lbuf is empty
    jsrl    polled_comm
    ifeq    hook.b,#hk_stravb           ; else, if S&C 6 bit
    jsrl    stravb_ecr_check
    jp      ean13h_3
ean13h_4:
    rbit    3,enir.b                    ; kill vand interrupts
    jsrl    unpack                      ; unpack label, convert char's to ascii
    jsrl    clr6                        ; and stuff them into lbuf
    ifbit   0,flag4.b                   ; turn vand interrupts on, if required
    sbit    3,enir.b
```

```
        ld      xloc.v,#lbuf            ; get addr of string buffer
        jsrl    outst                   ; send the string
        jmpl    idle ;*************************
ean13m:                                 ; TRY TO ASSEMBLE THE TEC TWO LABEL PAIR
;*                                      ; FIRST LABEL
        ld      xloc.v,#l6s1            ; try it with L6S1 & R6S3
        ld      bloc.v,#r6s3
        jsrl    ean13_calck             ; calc the checksum for l6s1+r6s3
        ifeq    xloc.b,#0               ; test mod.10 result (00 = okay)
        jp      ean13n                  ; okay....
        jsrl    clr6                    ; not okay...we got garbage here, dump seg's!
        jmpl    nocapt1
ean13n:                                 ; SECOND LABEL    test L6S3 & R6S1
        ld      xloc.v,#l6s3            ; then, assemble 2nd label in upcbuf1
        ld      bloc.v,#r6s1
        jsrl    ean13_calck             ; calc the checksum for l6s3+r6s1
        ifeq    xloc.b,#0               ; test mod.10 result (00 = okay)
        jp      ean13o                  ; okay....now, test for ambiguity
        jsrl    clr6                    ; no go!...dump all seg buffers
        jmpl    nocapt1
ean13o:
        ld      xloc.v,#l6s1
        ld      bloc.v,#r6s1
        jsrl    ean13_calck             ; ambiguity test
        ifeq    xloc.b,#0               ; ambiguity found!
        jp      ean13p
        jmpl    ean13t                  ; okay! no ambiguity, send la'
ean13p:
        ifeq    r6s1.v,r6s3.v           ; are right half's the same?
        jp      ean13p_1
        jp      ean13q
ean13p_1:
        ifeq    r6s1+2.b,r6s3+2.b
        jp      ean13p_2
        jp      ean13q
ean13p_2:
        jsrl    clr6                    ; yes...problem! dump the labels
        jsrl    clr_upcbuf1
        jmpl    nocapt1
ean13q:
        ifeq    r6s3.b,CONTseg1+1.b     ; test UPCA-R segment collection order
        jp      ean13q_1
        jp      ean13r
ean13q_1:
        ifeq    r6s3+1.b,CONTseg1+2.b
        jp      ean13q_2
        jp      ean13r
ean13q_2:
        ifeq    r6s3+2.b,CONTseg1+3.b
        jmpl    ean13t
ean13r:
        ifeq    r6s1.b,CONTseg2+1.b
        jp      ean13r_1
        jsrl    clr6                    ; unresolved ambiguity...dump seg's
        jmpl    nocapt1
ean13r_1:
        ifeq    r6s1+1.b,CONTseg2+2.b
        jp      ean13r_2
```

```
        jsrl    clr6                    ; unresolved ambiguity...dump seg's
        jmpl    nocapt1
ean13r_2:
        ifeq    r6s1+2.b,CONTseg2+3.b
        jp      ean13t
        jsrl    clr6                    ; unresolved ambiguity...dump seg's
        jmpl    nocapt1
;*
ean13t:                                 ; final check....double read?
        ld      xloc.v,#16s3
        ld      bloc.v,#r6s1
        jsrl    stuff_13upcbuf1         ; store the 2nd label in upcbuf1
        jsrl    drt13                   ; do double read timeout check on the label
        ifeq    A,#0                    ; A = 0 if invalid timeouts
        jmpl    idle                    ; ok?
                                        ; SEND THE LABEL !!!!
        jsrl    grnon                   ; beep & turn on the green l.e.d.
        jsrl    beep
ean13t_1:
        ifeq    lbuf.b,#0               ; label buffer empty?
        jp      ean13t_2                ; yes...stuff it
                                        ; no....send char's out until it is
        jsrl    polled_comm
        ifeq    hook.b,#hk_stravb       ; else, if S&C 6 bit
        jsrl    stravb_ecr_check
        jp      ean13t_1
ean13t_2:
        ld      xloc.v,#16s1
        ld      bloc.v,#r6s3
        jsrl    stuff_131buf            ; store the 1st label in lbuf
        ld      xloc.v,#ee_ean13_id
        jsrl    rd93
        st      A,ID.v                  ; make the label id's
        ld      IDnx.b,#id_ean13
        ld      IDn.b,#id_ean13
        jsrl    outst                   ; output the first label
ean13t_3:
        ifeq    lbuf.b,#0               ; loop here sending chr's out for
        jp      ean13t_4                ; the first label until lbuf is empty
        jsrl    polled_comm
        ifeq    hook.b,#hk_stravb
        jsrl    stravb_ecr_check
        jp      ean13t_3
ean13t_4:
        rbit    3,enir.b                ; kill vand interrupts
        jsrl    unpack                  ; unpack label, convert char's to ascii
        jsrl    clr6                    ; and stuff them into lbuf
        ifbit   0,flag4.b               ; turn vand interrupts on, if required
        sbit    3,enir.b
        ld      xloc.v,#lbuf            ; get addr of string buffer
        jsrl    outst                   ; send the string
        jmpl    idle
```

```
;******
;********************
;*******************************
;******************************************
; ROUTINE:    stuff_13upcbuf1
; FUNCTION:   STUFF THE INDICATED EAN13-L AND UPCA-R SEGMENTS INTO
;             UPCBUF1.
; ENTRY:      X POINTS TO EAN13-L SEGMENT, B POINTS TO UPCA-R
;             SEGMENT
; EXIT:       UPCBUF1 CONTAINS A LABEL
;                         ---------------UPCBUF1 CONTENTS ------------------
;            byte -->:   0    1     2     3     4     5     6     7
;        contents -->:  13  L1/L2 L3/L4 L5/L6 L7/R1 R2/R3 R4/R5 R6/??
stuff_13upcbuf1:
        ld    upcbuf1.b,#13
        ld    A,[X+].b                   ; get the ean13L segment
        st    A,upcbuf1+1.b              ; d1/d2
        ld    A,[X+].b
        st    A,upcbuf1+2.b              ; d3/d4
        ld    A,[X+].b
        st    A,upcbuf1+3.b              ; d5/d6
        ld    A,[X+].b
        and   A,#0xF0
        st    A,upcbuf1+4.b              ; d7/0
;*
        ld    K,#3
        ld    X,B                        ; get UPC A,R segment
        ld    B,#upcbuf1+4
Lstuff_13A:
        ld    A,[X].b                    ; get R1/R2, R3/R4, R5/R6
        swap  A
        and   A,#0x0F
        or    A,[B].b                    ; OR it with L7, R2, R4
        st    A,[B].b                    ; store it back
        inc   B                          ; next upcbuf1 location
        ld    A,[X+].b                   ; get R1/R2, R3/R4, R5/R6 & X-pointer
        swap  A
        and   A,#0xF0                    ; mask it as R2/00 R4/00 R6/00
        st    A,[B].b                    ; store it in lbuf
        decsz K
        jp    Lstuff_13A
        ret
;****************************************************
; ROUTINE:    ean13_calck
; FUNCTION:   CALC THE CHECKSUM FOR THE EAN13 LABEL SPECIFIED
; ENTRY:      BY THE POINTERS X AND B, WHERE X POINTS TO THE
;             EAN13-L SEGMENT AND B TO THE UPCA-R SEGMENT
; EXIT:       X=00 IF OKAY
;                   ;/ segment -->    -- L6S1/3 ---    - R6S1/3 --
;                   ;/ digit   -->    1 2 3 4 5 6 7    1 2 3 4 5 6
;                   ;/ weight  -->    1 3 1 3 1 3 1    3 1 3 1 3 1
ean13_calck:
        ld    K,#3
        ld    Rv1.b,#0
        ld    Rv3.b,#0
ean13_calck1:                            ; stuff ean13 segment
        ld    A,[X].b
        swap  A
        and   A,#0x0F
        add   Rv1.b,A                    ; L1+L3+L5 --> Rv1
```

```
        ld      A,[X].b
        and     A,#0x0F
        add     Rv3.b,A             ; L2+L4+L6 --> Rv3
        inc     X
        decsz   kloc.b
        jp      ean13_calck1
;*
        ld      A,[X].b             ; get L7/0
        swap    A
        and     A,#0x0F
        add     Rv1.b,A
;*
        ld      K,#3
ean13_calck2:                       ; calc checksum portion for UPCA-R
        ld      A,[B].b
        swap    A
        and     A,#0x0F
        add     Rv3.b,A             ; R1+R3+R5 --> Rv3
        ld      A,[B].b
        and     A,#0x0F             ; R2+R4+R6 --> Rv1
        add     Rv1.b,A
        inc     B
        decsz   kloc.b
        jp      ean13_calck2
;*
        clr     A
        st      A,X
        ld      A,Rv3.b
        add     A,Rv3.b             ; CHECKSUM = 3*(RV3) + RV1
        add     A,Rv3.b
        add     A,Rv1.b
        div     A,#10               ; divide checksum by 10,
        ret                         ; remainder returned in X ;********************************************************
; NAME:     stuff_13lbuf
; FUNCTION: STUFF THE INDICATED EAN13-L AND UPCA-R SEGMENTS IN
;           LBUF.
; ENTRY:    X POINTS TO EAN13-L SEGMENT, B POINTS TO UPCA-R
;           SEGMENT
; EXIT:     LBUF CONTAINS A LABEL
;                          ---------------- LBUF CONTENTS --------------------
;           byte -->:    0     1       2       3       4       5       6       7
;           contents -->: 13   L1/L2   L3/L4   L5/L6   L7/R1   R2/R3   R4/R5   R6/??
stuff_13lbuf:                       ; store EAN13-L first label half in lbuf
        ld      lbuf.b,#13
        push    B                   ; save upc A-R addr.
        ld      bloc.w,#lbuf+1
        jsr     stuff_13A
;*
        ld      A,[X].b             ; get the 7th chr
        swap    A
        and     A,#0x0F
        or      A,#0x30
        st      A,[B].b             ; store chr in lbuf
        inc     B                   ; point B to next location in lbuf...
        pop     X                   ; restore upc A-R addr into X
stuff_13A:                          ; store UPCA-R first label half in lbuf
        ld      K,#3
```

```
stuff_13RA:
        ld      A,[X].b                 ; get chr
        swap    A
        and     A,#0x0F                 ; high order nibble
        or      A,#0x30                 ; make it ascii
        st      A,[B].b                 ; plug it into the label buffer
        inc     B
        ld      A,[X+].b                ; get chr & move X-pointer
        and     A,#0x0F                 ; extract low order nibble
        or      A,#0x30                 ; make it ascii
        st      A,[B].b                 ; plug it into the label buffer
        inc     B
        decsz   kloc.b
        jp      stuff_13RA
        ret
;*******************************************************
; ROUTINE:    drt13
; FUNCTION:   CALCULATE THE CHECKSUM OF THE EAN13 LABEL JUST READ.
;             IF IT IS THE SAME AS THE PREVIOUS ONE SEE IF THE
;             DOUBLE READ TIMEOUT HAS EXPIRED. IF NOT, DUMP THE
;             LABEL BUFFERS.
; ENTRY:
; EXIT:
drt13:                                  ; found a good upc/ean label
        ld      xloc.v,#upcbuf1+1       ; decide if it is the same as the previous one
        clr     A
        ld      K,#7
drt13_1:                                ; sum the elements in the label buffer
        xor     A,[X].b
        inc     X
        decsz   kloc.b
        jp      drt13_1
        and     aloc.v,#0x00FF
        ifeq    aloc.b,lbufcx.b         ; if checksums match....
        jp      drt13_3                 ; check if double read timeout has expired
drt13_2:
        st      A,lbufcx.b              ; no match...store the label  ksum
        ld      A,#0xFF                 ; return a true ($FF)
        ret
drt13_3:
        ifeq    drtout.b,#0x00          ; labels are the same
        jp      drt13_2                 ; allow same labels only after double
                                        ;     read timeout
        jsrl    clr6                    ; if no drtout here
        jsrl    clr_upcbuf1
        clr     A                       ; and return a false (#00)
        ret

:
        :
        :

majority_test:                          ; do final label correlation based on standard
                                        ; S.P. algorithm
```

```
;*  .JNTROLLER CODE FRAGMNET
;*
;*  COLLECT THE DECODED SEGMENTS FROM THE DECODER, PERFORM THE INITIAL
;*  SEGMENT CORRELATION TEST BASED ON THE SEGMENT TYPE BYTE AND DECIDE
;*  IF THE SEGMENT TYPE MERITS SPECIAL TREATMENT AS PART OF A CONTIGUOUS
;*  PAIR.
;***************************************************************
;*
;*      SEGMENT I.D. PREFIXES (SENT FROM 68000 WITH DATA)
;*
;*      #3F         UPC A,R segment
;*    * #3A         UPC A,L     "
;*    * #3E         UPC E       "
;*
;*    * #22         P2 ADDON    "
;*    * #25         P5 ADDON    "
;*
;*    * #1D         EAN 13,L    "
;*    * #18         EAN 8,R     "
;*    * #19         EAN 8,L     "
;*
;*      #07         UPC D       "
;*      #03         UPC D6      "
;*      #05         UPC D5      "
;*      #0A         UPC D4      "
;*      #09         UPC D3      "
;*      #06         UPC D2      "
;*      #0C         UPC D1      "
;*
;*      #43         CODE 3 of 9 label
;*      #45         INTERLEAVED 2 of 5 label
;*      #4C         CODE-A-BAR label
;*      #4E         CODE 93 label
;*      #48         CODE 128 label
;*      #49         Special Code 128 label (alter decoder parameters)
;*

;*******************************************************
;*******************************************************
;* Set in-place storeage area for TEC two label labels
setup_2label:
        rbit    upcd_en,flag1.b      ; D tickets and 2 label don't mix
        rbit    p2_req,flag2.b       ; don't allow addon segments
        rbit    p5_req,flag2.b
        rbit    ad_opt,flag4.b       ; no optional addon's snuck in either ld      xloc.v,#ee_Tflag1112 ; load two label flag pairs
        jsrl    rd93                 ; for first label - flag pairs 1 & 2
        ld      Tflag11.b,aloc+1.b
        st      A,Tflag12.b ld      xloc.v,#ee_Tflag1314 ; load two label flag pairs
        jsrl    rd93                 ; for first label - flag pairs 3 & 4
        ld      Tflag13.b,aloc+1.b
        st      A,Tflag14.b ld      xloc.v,#ee_Tflag2122 ; load two label flag pairs
        jsrl    rd93                 ; for second label - flag pairs 1 & 2
        ld      Tflag21.b,aloc+1.b
        st      A,Tflag22.b
```

```
        ld      xloc.v,#ee_Tflag23&.     ; load two label flag pairs
        jsrl    rd93                     ; for second label - flag pairs 3 & 4
        ld      Tflag23.b,aloc+1.b
        st      A,Tflag24.b
        ret ;*********************************************************************
;*********************************************************************
;* Collect and correlate segments and label data passed by the 68000.
idav1:
        ifbit   0,hpc_stat.b             ; data available ??? (1 = data available)
        jp      idav11                   ; yes...go get it
        ret                              ; no...return
idav11:
        rbit    3,enir.b                 ; if we get here, turn off the wand interrupt
                                         ; at exit test whether to turn it on again push    A
        push    B
        push    X
        push    K ifbit   two_label,flag4.b
        jp      idav11a
        jp      idav11b
idav11a:
        ld      workbuf2.v,#0x0000       ; in TEC Two Label Mode clear workbuf2
        ld      workbuf2+2.v,#0x0000     ; otherwise, leave it alone !

idav11b:
        sbit    seg_found,CCR.b          ; mark that we've found a segment or label
        clr     A                        ; clear A
        st      A,xloc.v                 ; clear X high byte
        st      A,kloc.v                 ; clear K rbit    have_2seg,flag5.b        ; 2nd half of contig. seg flag
        rbit    have_1seg,flag5.b        ; 1st half of contig. seg. flag ld      A,hpc_data.b             ; get the data char.
        st      A,hpc_clr_stat.b         ; clear the dack flag
        ld      hpc_data.b,#0xAA         ; send the ack char
        ifbit   7,aloc.b                 ; UPC A and EAN 8 and 13 tickets with contig.
        sbit    have_1seg,flag5.b        ; seg's come here with bit 7 set
        and     A,#0x7F

:
        :
        :

idav12:
        st      A,bloc.v                 ; store the label type in B
        ld      workbuf.v,#0x0000        ; Clear the working seg buffer "workbuf"
        ld      workbuf+2.v,#0x0000
        ld      xloc.v,#workbuf          ; get temporary scan buffer storage area

:
        :
        :

;*
```

```
;*   BYTE  UPC/EAN SEGMENT ST  ..
;*               |------|------|
;*       0       |  1   |  2   |
;*               |------|------|
;*       1       |  3   |  4   |
;*               |------|------|
;*       2       |  5 * |  6 * |
;*               |------|------|
;*       3       |7/id**|0/ID**|
;*               |------|------|
;*
```

```
** or *   --> non-existent cells for four
                 char segments

**        --> non-existent cells for r6sx
              segments id        --> 0-9  ean13
               A   upcAL
               D   upcD
ID        --> E   upcE
```

```
    ifeq  A,#0x3F
    jmpl  r6lp              ; if A = 3F store UPC_A,R seg.
    ifeq  A,#0x3A
    jmpl  l6lp              ; if A = 3A store UPC_A,L seg.
    ifeq  A,#0x3E
    jmpl  l6lp              ; if A = 3E store UPC_E seg.

ifeq  A,#0x22
    jmpl  adlp2             ; if A = 22 store P2 addon seg.
    ifeq  A,#0x25
    jmpl  adlp5             ; if A = 25 store P5 addon seg.

ifeq  A,#0x1D
    jmpl  l6lp              ; if A = 1D store EAN13_L seg.
    ifeq  A,#0x18
    jmpl  r4lp              ; if A = 18 store EAN8_R seg.
    ifeq  A,#0x19
    jmpl  l4lp              ; if A = 19 store EAN8_L seg.

ifeq  A,#0x07
    jmpl  l6lp              ; if A = 07 store UPC_D seg.
    ifeq  A,#0x0C
    jmpl  dn1               ; if A = 0C store N1 seg.
    ifeq  A,#0x06
    jmpl  dn2               ; if A = 06 store N2 seg.
    ifeq  A,#0x09
    jmpl  dn3               ; if A = 09 store N3 seg.
    ifeq  A,#0x0A
    jmpl  dn4               ; if A = 0A store N4 seg.
    ifeq  A,#0x05
    jmpl  dn5               ; if A = 05 store N5 seg.
    ifeq  A,#0x03
    jmpl  dn6               ; if A = 03 store N6 seg.

:
    :
    :

jmp   endavlC
;***************************************************
endavl:
    ifbit have_1seg,flag5.b  ; expecting second half of contig. seg's
    jp    endavlD            ; yes...go get it!
endavlA:
    ifbit ad_opt,flag4.b     ; are we doing optional addon's
    jp    endavlB
    jp    endavlC            ; no...quit
endavlB:
```

```
        ifeq    R14.b,#adscnt           ; did we just work on an addo. eg?
        jmpl    endopt                  ; yes...
endavlC:                                ; no..quit
        pop     K
        pop     X                       ; restore registers and return
        pop     B
        pop     A
        ifbit   0,flag4.b               ; enable vend interrupt?
        sbit    3,enir.b                ; yes...
        ret
endavlD:
        ifbit   0,hpc_stat.b            ; more data available ???
        jp      endavlE                 ; yes...go get it
        jp      endavlC                 ; no...quit
endavlE:
        rbit    have_1seg,flag5.b
        sbit    have_2seg,flag5.b
        clr     A                       ; clear A
        st      A,xloc.v                ; clear X
        st      A,kloc.v                ; clear K
        st      A,bloc.v                ; clear B
        ld      A,hpc_data.b            ; get the data char.
        st      A,hpc_clr_stat.b        ; clear the dack flag
        ld      hpc_data.b,#0xAA        ; send the ack char
        and     A,#0x7F
        jmpl    idavl2
;******************************
endopt:                                 ; for optional addon's do the majority
        ld      xloc.v,#adscnt          ; test in place
        clr     A
        ld      A,[X].b                 ; extract 51cnt (majority count)
        swap    A
        and     aloc.v,#0x0F
        st      A,kloc.v                ; adscnt --> K
        ifeq    A,#0                    ; need at least 1 count
        jp      endavlC                 ; not there...exit
endopt2:
        ld      A,1[X].b                ; adstot --> A
        sc
        subc    A,K                     ; adstot - adscnt --> A = error count
        and     aloc.v,#0x000F
        ifeq    aloc.b,#0x00            ; CASE 1: no misreads
        jmpl    endopt_ok
        ifeq    aloc.b,#0x01            ; one misread
        jp      endopt3
        ifeq    aloc.b,#0x02            ; two misreads
        jp      endopt4
        jmp     endopt_err1             ; CASE 4: >2 misreads (we should not get here)
endopt3:                                ; CASE 2: 1 misread
        ifgt    kloc.b,#0x03            ; if good read >= 3, set okay flag
        jp      endopt_ok
        ifeq    kloc.b,#0x03
        jp      endopt_ok
        jp      endopt_err
endopt4:                                ; CASE 3: 2 misreads
        ifeq    kloc.b,#0x0F            ; if good read = 15, set okay flag
        jp      endopt_ok
        jp      endopt_err
endopt_ok:                              ; all tests passed !
        sbit    addon,CCR.b
```

```
        rbit   single_scan,flag         ; drop single contig. scan re   ement
        jp     endavlC
endopt_err1:
        clr    A                        ; if correlation algorithm failure
        st     A,[X].b                  ; clear variable associated with the
        st     A,1[X].b                 ; segment and return
endopt_err:                              ; majority test failed, return 0
        rbit   addon,CCR.b
        sbit   single_scan,flag4.b
        ld     cntrq.b,adopt_cnt.b      ; min required count is 3
        jp     endavlC ;****************************************************
;* <<<<<<<<-- UPC A,R segments
r61p:
        ld     K,#0x03                  ; store 6 packed char's in 3 bytes of LBUF2
        jsrl   lxlp
        ifbit  seg_en,CCR.b             ; segment collection enabled ?
        jp     r61p_go                  ; yes...check & store segment
        jmpl   endavlC                  ; no....just exit
r61p_go:
        ifbit  single_scan,flag4.b      ; single scan of contig. seg's required?
        jp     r61p_1                   ; yes...
        jp     r61p_2
r61p_1:
        ifbit  have_1seg,flag5.b        ; 1st contig. seg of label?
        jp     r61p_2
        ifbit  have_2seg,flag5.b        ; 2nd contig seg of label?
        jp     r61p_2
        jmpl   endavlC                  ; no...dump seg
r61p_2:
        ifbit  two_label,flag4.b        ; TEC TWO LABEL Mode?
        jp     r61p_3                   ; yes...
r61p_2a:
        ld     bloc.w,#r6scnt           ; no...load the variables and check segment
        ld     R11.b,#r6s1
        ld     R12.b,#r6s2
        ld     R13.b,#3
        jmpl   cxseg
r61p_3:                                  ; TEC TWO LABEL MODE !
        ifbit  have_2seg,flag5.b        ; 2nd contig seg of label?
        jp     r61p_4
        ifbit  have_1seg,flag5.b        ; first contig. seg.?
        jmp    r61p_10
        jmpl   r61p_12
r61p_4:                                  ; store seg in contig buffer
        ifeq   R14.b,#16scnt            ; last seg found 16s1?
        jmp    r61p_6
        ifeq   R14.b,#X16scnt           ; last segment found 16s3?
        jp     r61p_5
        jmp    r61p_12                  ; neither!...do reg check r61p_5:                                  ; LAST SEGMENT WAS L6S3
        ld     CONTseg2+1.b,workbuf.b   ; store the segment away
        ld     CONTseg2+2.b,workbuf+1.b
        ld     CONTseg2+3.b,workbuf+2.b
        jp     r61p_7 r61p_6:                                  ; LAST SEGMENT WAS L6S1
        ld     CONTseg1+1.b,workbuf.b   ; store the segment away
```

```
        ld      CONTseg1+2.b,vork.b
        ld      CONTseg1+3.b,vorkbuf+2.b r6lp_7:
        ifeq    CONTseg1+1.b,CONTseg2+1.b
        jp      r6lp_7a
        jmp     r6lp_12
r6lp_7a:
        ifeq    CONTseg1+2.v,CONTseg2+2.v
        jp      r6lp_7b
        jmp     r6lp_12
r6lp_7b:
        clr     A
        st      A,CONTseg1.v
        st      A,CONTseg1+2.v
        st      A,CONTseg2.v
        st      A,CONTseg2+2.v
        jp      r6lp_12 r6lp_10:
        ld      vorkbuf2.b,vorkbuf.b
        ld      vorkbuf2+1.b,vorkbuf+1.b
        ld      vorkbuf2+2.b,vorkbuf+2.b r6lp_12:
        ifeq    r6s1.b,#0               ; r6s1 is empty?
        jmp     r6lp_9
        ifeq    vorkbuf.v,r6s1.v        ; vorkbuf = r6s1?
        jp      r6lp_12a
        jp      r6lp_8                  ; no
r6lp_12a:
        ifeq    vorkbuf+2.b,r6s1+2.b    ; vorkbuf = r6s1?
        jp      r6lp_9                  ; yes
                                        ; no....
r6lp_8:
        ld      bloc.v,#Xr6scnt         ; S3/S4cnt addr
        ld      R11.b,#r6s3             ; r6S3 addr
        ld      R12.b,#r6s4             ; r6S4 addr.
        ld      R13.b,#3                ; seg byte count
        jmpl    cxseg r6lp_9:
        ld      bloc.v,#r6scnt          ; S1/S2cnt addr
        ld      R11.b,#r6s1             ; r6S1 addr
        ld      R12.b,#r6s2             ; r6S2 addr.
        ld      R13.b,#3                ; seg byte count
        jmpl    cxseg ;******************************************
;* <<<<<<<-- UPC D, UPC E and UPC A,L , EAN13,L segments
l6lp:
        ld      K,#0x03
        jsrl    lxlp                    ; get 6 chr's
        ifeq    B,#0x3A                 ; if UPC A,L
        jmpl    l6lpa
        ifeq    B,#0x07                 ; if UPC D
        jmpl    l6lpd
                                        ; else UPC E or EAN13
        jsrl    getlkl                  ; get the seventh chr
        swap    A
```

```
        and     A,#0xF0
        ifeq    B,#0x3E                 ; UPC-E seg ?
        or      A,#0x0E                 ; yes...mark label as UPC E
        st      A,[X].b                 ; <-- both UPC E and EAN13 take this path
        ifeq    B,#0x3E                 ; if UPC E, leave here
        jp      16lpe
        jmpl    16lp13

;********** UPC D and UPC E SEGMENTS EXIT HERE ********************
16lpd:
        ld      A,#0xD0                 ; *** UPC D ***
        st      A,[X].b                 ; | d1/d2 | d3/d4 | d5/d6 | D/0 |
16lpe:
        ld      bloc.v,#16scnt          ; *** UPC E ***
        ld      Ri1.b,#16s1             ; | d1/d2 | d3/d4 | d5/d6 | d7/E |
        ld      Ri2.b,#16s2
        ld      Ri3.b,#4
        jmpl    cxseg ;******** ONLY UPC A and EAN13 SEGMENTS GET HERE **************

16lpa:
        ld      A,#0xA0                 ; *** UPC A ***
        st      A,[X].b                 ; | d1/d2 | d3/d4 | d5/d6 | A/0 |
        ld      bloc.v,#16scnt          ; load the variables and check segment
        ld      Ri1.b,#16s1
        ld      Ri2.b,#16s2
        ld      Ri3.b,#0x04
16lpa_1:                                ; TEST FOR CONTIGUOUS LABEL MODE
        ifbit   single_scan,flag4.b     ; single scan of contig. seg's required?
        jp      16lpa_2                 ; yes...
        jmpl    cxseg                   ; no...just collect seg's
16lpa_2:
        ifbit   have_1seg,flag5.b       ; yes...1st half of contig. seg's?
        jmpl    cxseg                   ; yes...
        ifbit   have_2seg,flag5.b       ; 2nd half of contig. seg's?
        jmpl    cxseg                   ; yes...
        jmpl    endavlC                 ; no...dump seg ;**************************************** EAN13 *
16lp13:                                 ; | d1/d2 | d3/d4 | d5/d6 | d7/0 |
        ifbit   seg_en,CCR.b            ; segment collection enabled ?
        jp      16lp13_go
        jmpl    endavlC                 ; no....just exit
16lp13_go:
        ifbit   single_scan,flag4.b     ; contig. seg's required?
        jp      16lp13_1                ; yes...
        jp      16lp13_2                ; no...try TEC TWO LABEL MODE
16lp13_1:
        ifbit   have_1seg,flag5.b       ; yes...1st half of contig. seg's?
        jp      16lp13_2
        ifbit   have_2seg,flag5.b       ; 2nd half of contig. seg's?
        jp      16lp13_2
        jmpl    endavlC                 ; no...dump it
16lp13_2:
        ifbit   two_label,flag4.b       ; TEC TWO LABEL Mode?
        jp      16lp13_3                ; yes...
        ld      bloc.v,#16scnt          ; no...load the variables and check segment
        ld      Ri1.b,#16s1
        ld      Ri2.b,#16s2
```

```
         ld    R13.b,#4
         jmpl  cxseg
161p13_3:                              ; TEC TWO LABEL MODE !!!
         ifbit have_1seg,flag5.b       ; yes...1st half of contig. seg's?
         jp    161p13_4
         ifbit have_2seg,flag5.b       ; 2nd half of contig. seg's?
         jp    161p13_4
         jmpl  161p13_12
161p13_4:                              ; store seg in contig buffer
         ifeq  workbuf.b,Tflag21.b     ; one of 2nd label F1F2 prefixes?
         jmpl  161p13_6
         ifeq  workbuf.b,Tflag22.b
         jmpl  161p13_6
         ifeq  workbuf.b,Tflag23.b
         jmpl  161p13_6
         ifeq  workbuf.b,Tflag24.b
         jmpl  161p13_6
;                                      ; else assume 1st label F1F2 prefix
161p13_5:
         ld    CONTseg1.b,workbuf.b    ; only store the 1st 2 chr of L6S1 seg's
         ifbit have_2seg,flag5.b       ; is this the 2nd seg of a contig. pair?
         jp    161p13_5b
         jp    161p13_5a
161p13_5b:
         ld    CONTseg1+1.b,workbuf2.b
         ld    CONTseg1+2.b,workbuf2+1.b
         ld    CONTseg1+3.b,workbuf2+2.b
161p13_5a:
         ld    bloc.w,#16scnt          ; S1/S2cnt addr
         ld    R11.b,#16s1             ; xxS1 addr
         ld    R12.b,#16s2             ; xxS2 addr.
         ld    R13.b,#4                ; seg byte count
         jmpl  cxseg                   ; no....

161p13_6:
         ld    CONTseg2.b,workbuf.b    ; only the first 2 chr of L6S3 seg's
         ifbit have_2seg,flag5.b       ; is this the 2nd seg of a contig. pair?
         jp    161p13_6b
         jp    161p13_6a
161p13_6b:
         ld    CONTseg2+1.b,workbuf2.b
         ld    CONTseg2+2.b,workbuf2+1.b
         ld    CONTseg2+3.b,workbuf2+2.b
161p13_6a:
         ld    bloc.w,#X16scnt         ; S1/S2cnt addr
         ld    R11.b,#16s3             ; xxS1 addr
         ld    R12.b,#16s4             ; xxS2 addr.
         ld    R13.b,#4                ; seg byte count
         jmpl  cxseg                   ; no....

161p13_12:
         ifeq  workbuf.b,Tflag21.b     ; one of 2nd label F1F2 prefixes?
         jp    161p13_6a
         ifeq  workbuf.b,Tflag22.b
         jp    161p13_6a
         ifeq  workbuf.b,Tflag23.b
         jp    161p13_6a
         ifeq  workbuf.b,Tflag24.b
         jp    161p13_6a
         jp    161p13_5a               ; no! assume 1st label F1F2 prefix
```

```
;**************************************************
;* Get one char over the local data bus
getlkl:
    ifbit  0,hpc_stat.b         ; wait for 68000 to write data
    jp     gl1                  ; then...get it
    jp     getlkl
gl1:
    clr    A
    ld     A,hpc_data.b         ; get the data
    st     A,hpc_clr_stat.b     ; clear the dack flag
    ld     hpc_data.b,#0xAA     ; send the ack char
    ret
;**************************************************
;* Store K characters in K/2 packed bytes. Enter
;* with X = upc workbuf and K = byte count (char_count/2).
lxlp:
    jsr    getlkl               ; get first char
    swap   A                    ; A = xxXx, where X is desired char
    st     A,R11.b              ; R11 <-- A
    jsr    getlkl               ; get next char, A = xxxY
    or     A,R11.b              ; A = xx0Y + xxX0 = xxXY
    st     A,[X].b              ; A --> (X)
    inc    X                    ; X = X+1
    decsz  K                    ; K = K-1, if K = 0 exit
    jp     lxlp
    ret                         ; at exit X = X+(K/2)+1, next open byte
;**************************************************
;* (1) Compare S1cnt and S2cnt to 0, if S1cnt = 0 store seg.
;* at workbuf in xxS1, else if S2cnt = 0 store seg. in xxS2.
;* Then, increment S1/S2cnt and STOT.
;* (2) Otherwise, check seg. in workbuf against xxS1 and xxS2.
;* If a match is found check S1/S2cnt and increment it and STOT
;* if Sxcnt < #F. If Sxcnt = #F, just exit.
;* Then, check for S2cnt > S1cnt. If so, swap xxS1 and xxS2
;* segements and counts.
;* (3) If STOT >= 3 and STOT-1>S1cnt+S2cnt, clear S1cnt, S2cnt,
;* and STOT. (This allows for a max. of two non-majority counts).
;*
;* Enter: B reg. = addr. S1/S2cnt (REM: xxSTOT = addr_S1/S2cnt+1)
;*        R11    = addr xxS1 seg. buffer
;*        R12    = addr xxS2 seg. buffer
;*        R13    = seg. byte count
cxseg:
    ifbit  seg_en,CCR.b         ; segment collection enabled ?
    jp     ckseg1               ; yes...check & store segment
    jmpl   endavlC              ; no....just exit
ckseg1:
    clr    A
    st     A,xloc.w
    and    bloc.w,#0x00FF       ; extract addr. S1/S2cnt
    ld     R14.b,bloc.b         ; pass it off to R14
;*
    ld     X,R11.b              ; get S1_seg addr.
    ld     A,[B].b              ; get S1/S2cnt
```

```
        svap    A
        and     aloc.v,#0x000F
        ifeq    aloc.b,#0x00            ; no seg.'s found yet!
        jp      stoS1
                                        ; else, seg found already. Are they the same?
        ld      A,[X].v                 ; get first 4 char's of S1_seg
        ifeq    A,vorkbuf.v             ; same as vorkbuf ?
        jp      incS1                   ; yes... increment S1cnt & xxSTOT
        jmp     cx_S2                   ; no... check for S2_Seg or other
stoS1:
        ld      K,R13.b                 ; get segment byte count
        ld      bloc.v,#vorkbuf         ; get the temp. buffer base addr.
stoS1a:                                 ; REM   B = xxS1/S2 seg_addr.
        ld      A,[B].b                 ; get char's to move
        st      A,[X].b                 ; move into xxSx segment buffer
        inc     X
        inc     B
        decsz   kloc.b                  ; repeat for byte_count pairs
        jp      stoS1a
        ld      B,R14.b                 ; get back S1/S2cnt addr.
incS1:
        clr     A
        ld      A,[B].b                 ; get S1cnt
        svap    A
        and     aloc.v,#0x000F
        ifeq    aloc.b,#0x0F            ; if S1cnt = #F, just exit
        jmpl    endav1
        ld      A,[B].b
        add     A,#0x10                 ; else, increment S1cnt
        st      A,[B].b
        inc     1[B].b                  ; increment xxSTOT
        jmpl    endav1                  ; then exit ;*
cx_S2:
        ld      X,R12.b                 ; get S2_seg addr.
        ld      A,[B].b                 ; extract S2cnt
        and     aloc.v,#0x000F
        ifeq    aloc.b,#0x00            ; if this is the first S2 segment
        jp      stoS2                   ; store the segment in S2_seg
        jp      cx_S2a                  ; else, do further tests
stoS2:
        inc     [B].b                   ; increment S2scnt
        inc     1[B].b                  ; increment xxSTOT
        ld      K,R13.b                 ; get segment byte count
        ld      bloc.v,#vorkbuf         ; get the temp. buffer base addr.
stoS2a:                                 ; REM   B = xxS1/S2 seg_addr.
        ld      A,[B].b                 ; get char's to move
        st      A,[X].b                 ; move into xxSx segment buffer
        inc     X
        inc     B
        decsz   kloc.b                  ; repeat for byte_count pairs
        jp      stoS2a
        jmpl    endav1                  ; and exit
cx_S2a:
        ld      A,[X].v                 ; get char's in S2_seg
        ifeq    A,vorkbuf.v             ; are they identical with those in vorkbuf?
        jp      incS2                   ; yes...
        jp      incSTOT                 ; no...we've a new segment not xxS1 or xxS2
incS2:
```

```
         inc   [B].b              ; increment S2scnt
incSTOT:
         inc   1[B].b             ; increment xxSTOT
;*
;*                                ; NOW, CHECK FOR MAX. ERROR RATIO
         clr   A
         ld    A,[B].b            ; get S1/S2cnt
         st    A,X
         swap  A                  ; extract S1cnt --> A
         and   aloc.w,#0x000F
         and   xloc.w,#0x000F     ; extract S2cnt --> B
         ifgt  aloc.b,xloc.b      ; if S1cnt > S2cnt
         jp    cx_S2b
         ifeq  aloc.b,xloc.b      ; if S1cnt = S2cnt
         jp    cx_S2b
         jp    cx_S2c             ; if S1cnt < S2cnt
cx_S2b:
         st    A,xloc.w           ; save S1cnt
         ld    A,1[B].b           ; get xxSTOT
         sc
         subc  A,xloc.b           ; check if xxSTOT - S1scnt > 2
         and   aloc.w,#0x00FF
         ifgt  aloc.b,#0x0002
         jmp   cx_err
         jmpl  endavl
cx_S2c:                           ; REM A = S1cnt  B = S2cnt
         x     A,X                ; S1scnt --> B   S2cnt --> A
         swap  A
         and   aloc.w,#0x00F0
         or    A,X                ; make new S1/S2cnt  (S2/S1cnt)
         st    A,[B].b
         swap  A
         and   aloc.w,#0x000F     ; get back new S1cnt
         st    A,xloc.w
         ld    A,1[B].b           ; get xxSTOT
         rc
         subc  A,xloc.b
         and   aloc.w,#0x00FF
         ifgt  aloc.b,#0x02
         jmp   cx_err
cx_S2d:                           ; if okay to here, swap segments
         ld    X,R11.b            ; get S1_seg addr.
         ld    B,R12.b            ; get S2_seg addr.
         ld    K,R13.b            ; get segment byte count
swapseg:
         ld    A,[X].b            ; get S1_seg char
         x     A,[B].b            ; swap S1_seg char with S2_seg char
         st    A,[X].b            ; store S2_seg char in place of S1_seg char
         inc   B
         inc   X
         decsz kloc.b
         jp    swapseg
         jmpl  endavl
cx_err:
         clr   A
         st    A,[B].b            ; clear S1/S2cnt
         st    A,1[B].b           ; clear xxSTOT
         jmpl  endavlC
```

Having described the invention in detail and by reference to the preferred embodiment thereof, it will be apparent that other modifications and variations are possible without departing from the scope of the invention defined in the appended claims.

What is claimed is:

1. A method of scanning a pair of bar code labels to determine the bar code data printed thereon by repeatedly sweeping a beam in a succession of scanning passes, each label having a right segment defining right segment data and a left segment defining left segment data, and the left segment data and right segment data from each label combinable to form a valid checksum, comprising the steps of:

scanning the pair of labels to determine the left segment data of the pair of labels and the right segment data of the pair of labels, if a left segment and a right segment were scanned during a single scanned pass across either or both of the pair of labels, storing an indication thereof, selecting left segment data from a first left segment and right segment data from a first right segment and calculating a first checksum, if the first checksum is valid, then selecting left segment data from said first left segment and right segment data from the second right segment and calculating a second checksum, if the second checksum is valid, then selecting left segment data from the second left segment and right segment data from the first right segment and calculating a third checksum, if the third checksum is valid, then selecting left segment data from said second left segment and right segment data from said second right segment and calculating a fourth checksum, if the first, second, third, and fourth checksum data are valid, and if a left segment and a right segment were scanned a the beam made a single scanning pass across a pair of labels, then accepting the left segment and a right segment which were scanned as the beam made a single scanning pass across the pair of labels as providing scan data from the same label, and the other left segment and right segment as providing scan data from the other label, and if the first, second, third, and fourth checksum data are valid, and if a left segment and a right segment were not scanned as the beam made a single scanning pass across either of the pair of labels, then rejecting the data from the first and second left segment and the first and second right segment.

2. The method of scanning a pair of bar code labels of claim 1, in which the step of scanning the pair of labels to determine the left segment data of the pair of labels and the right segment data of the pair of labels, includes the step of scanning a pair of EAN-13 labels affixed to a single product.

3. The method of scanning a pair of bar code labels of claim 1, in which the step of scanning the pair of labels to determine the left segment data of the pair of labels and the right segment data of the pair of labels, includes the step of scanning a pair of UPC-A labels affixed to a single product.

4. The method of scanning a pair of bar code labels of claim 1, in which the step of scanning the pair of labels to determine the left segment data of the pair of labels and the right segment data of the pair of labels, includes the step of scanning a pair of EAN-8 labels affixed to a single product.

5. A method of determining the bar code data printed on a pair of concatenated, two-segment bar code labels, which labels have been scanned by repeatedly sweeping a beam in a succession of scanning passes to determine the left segment data of each of the pair of labels and the right segment data of each of the pair of labels, said labels being of the type in which the left segment data and right segment data from each label are combinable to form a valid checksum, comprising the steps of:

selecting left segment data from a first left segment and right segment data from a first right segment and calculating a first checksum, if the first checksum is valid, then selecting left segment data from said first left segment and right segment data from the second right segment and calculating a second checksum, if the second checksum is valid, then selecting left segment data from the second left segment and right segment data from the first right segment and calculating a third checksum, if the third checksum is valid, then selecting left segment data from said second left segment and right segment data from said second right segment and calculating a fourth checksum, If the first, second, third, and fourth checksum data are valid, and if a left segment and a right segment were scanned as the beam made a single scanning pass across a pair of labels, then accepting the left segment and a right segment which were scanned as the beam made a single scanning pass across the pair of labels as providing scan data from the same label, and the other left segment and right segment as providing scan data from the other label, and if the first, second, third, and fourth checksum data are valid, and if a left segment and a right segment were not scanned as the beam made a single scanning passing across either of the pair of labels, then rejecting the data from the first and second left segment and the first and second right segment.

6. The method of determining the bar code data printed on a pair of concatenated, two-segment bar code labels of claim 5, further including the step of storing an indication if a left segment and a right segment were scanned during a single scanning pass across either or both of the pair of labels.

7. The method of determining the bar code data printed on a pair of concatenated, two-segment bar code labels of claim 5, in which the labels comprise a air of EAN-13 labels affixed to a single product.

8. The method of determining the bar code data printed on a pair of concatenated, two-segment bar code labels of claim 5, in which the labels comprise a pair of UPC-A labels affixed to a single product.

9. The method of determining the bar code data printed on a pair of concatenated, two-segment bar code labels of claim 5, in which the labels comprise a pair of EAN-8 labels affixed to a single product.

10. A computer controlled bar code scanner system for scanning a pair of bar code labels to determine the bar code data printed thereon by repeatedly sweeping a beam in a succession of scanning passes, each label having a right segment defining right segment data and a left segment defining left segment data, and the left segment data and right segment data from each label combinable to form a valid checksum, comprising:

scanner means for sweeping a scanning beam across a scanning station and providing a scan signal indicating markings on surfaces presented to said scan station, and computer means, responsive to said scanner means, for interpreting said scan signal as scan data signified by scanned bar code labels, said computer means including means for controlling said scanner means to perform the steps of
- scanning the pair of labels to determine the left segment data of the pair of labels and the right segment data of the pair of labels,
- if a left segment and a right segment were scanned during a single scanning pass across either or both of the pair of labels, storing an indication thereof,
- selecting left segment data from a first left segment and right segment data from a first right segment and calculating a first checksum,
- if the first checksum is valid, then selecting left segment data from said first left segment and right segment data from the second right segment and calculating a second checksum,
- if the second checksum is valid, then selecting left segment data from the second left segment and right segment data from the first right segment and calculating a third checksum,
- if the third checksum is valid, then selecting left segment data from said left segment and right segment data from said second right segment and calculating a fourth checksum,
- if the first, second, third, and fourth checksum data are valid, and if a left segment and a right segment were scanned as the beam made a single scanning pass across a pair of labels, then accepting the left segment and a right segment which were scanned as the beam made a single scanning pass across the pair of labels as providing scan data from the same label, and the other left segment and right segment as providing scan data from the other label, and
- if the first, second, third, and fourth checksum data are valid, and if a left segment and a right segment were not scanned as the beam made a single scanning pass across either of the pair of labels, then rejecting the data from the first and second left segment and the first and second right segment.

11. The computer controlled bar code scanner system for scanning bar code labels of claim 10, in which the labels comprise a pair of EAN-13 labels affixed to a single product.

12. The computer controlled bar code scanner system for scanning bar code labels of claim 10, in which the labels comprise a pair of UPC-A labels affixed to a single product.

13. The computer controlled bar code scanner system for scanning bar code labels of claim 10, in which the labels comprise a pair of EAN-8 labels affixed to a single product.

* * * * *